Aug. 22, 1950     O. W. OERMAN ET AL     2,519,497
PLOW LIFT MECHANISM

Filed July 6, 1945     2 Sheets-Sheet 1

*INVENTORS*
OREY W. OERMAN
JULIUS PETERSON.

BY

*ATTORNEYS.*

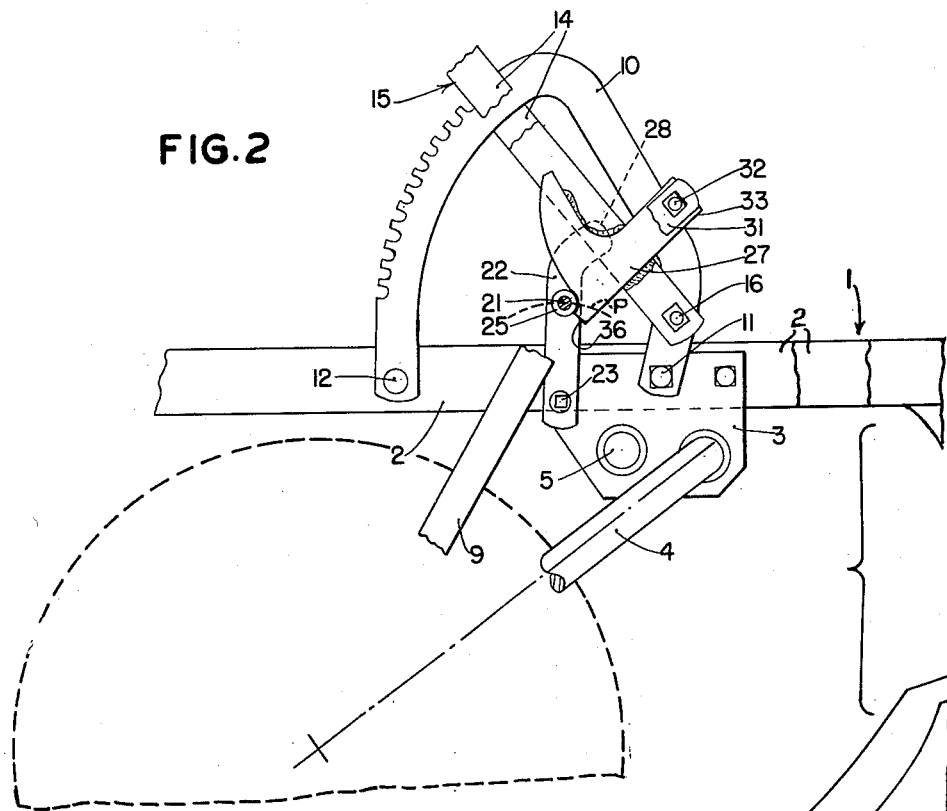
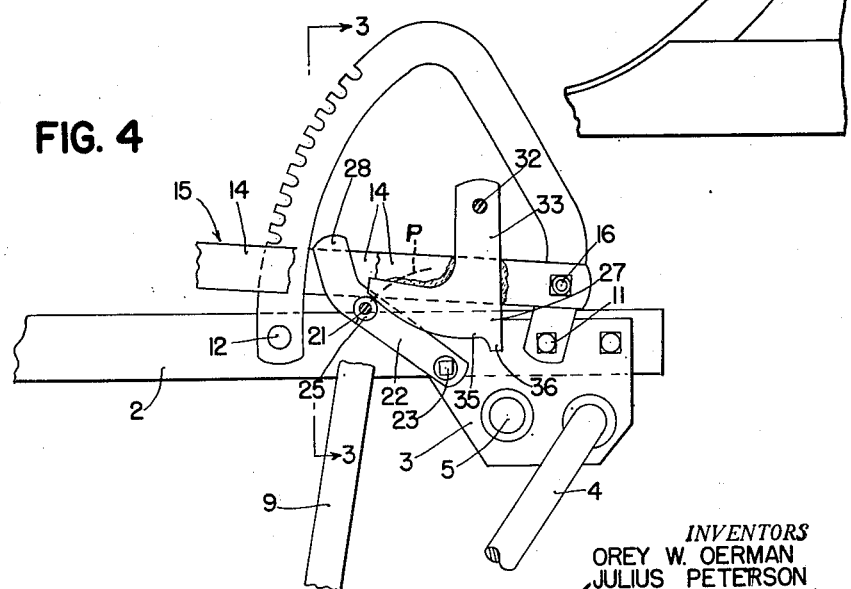

Patented Aug. 22, 1950

2,519,497

UNITED STATES PATENT OFFICE 2,519,497

PLOW LIFT MECHANISM

Orey W. Oerman and Julius Peterson, Moline, Ill., assignors to Deere & Company, Moline, Ill., a corporation of Illinois Application July 6, 1945, Serial No. 603,468

12 Claims. (Cl. 97—73)

The present invention relates generally to agricultural implements and more particularly to such implements as plows and the like.

The object and general nature of the present invention is the provision of a new and improved power lift mechanism for farm implements, particularly plows, and it is a further feature of this invention to provide a new and improved adjusting mechanism for plows and other implements of the traction lift type. More particularly, it is a feature of this invention to provide a power lift mechanism for use with implements having a swinging crank axle, the swinging of which relative to the frame of the implement serves to raise and lower the implement, and it is a more specific feature of this invention to provide depth adjusting means in which the disposition of the latter in different positions of adjustment does not have any material effect on changing the position of the swinging crank axle or other parts when they are in their raised or transport position. Still further, it is an important feature of this invention to provide power lift adjusting mechanism which is strong and rigid and which has cooperating parts for stabilizing one with respect to the other whereby loads in operation which might tend to deflect or displace certain of the parts are adequately accommodated without straining or otherwise overloading any of the parts.

These and other objects and advantages of the present invention will be apparent to those skilled in the art after a consideration of the following detailed description, taken in conjunction with the accompanying drawings in which one preferred form of the present invention has been shown by way of illustration.

In the drawings:

Figure 2 is a side view showing the adjusting mechanism in a position for deep plowing, but with the crank axle and associated parts in their raised or transport position.

Figure 4 is a view similar to Figure 2, showing the adjusting mechanism in a position for shallow plowing.

Figures 1, 3:
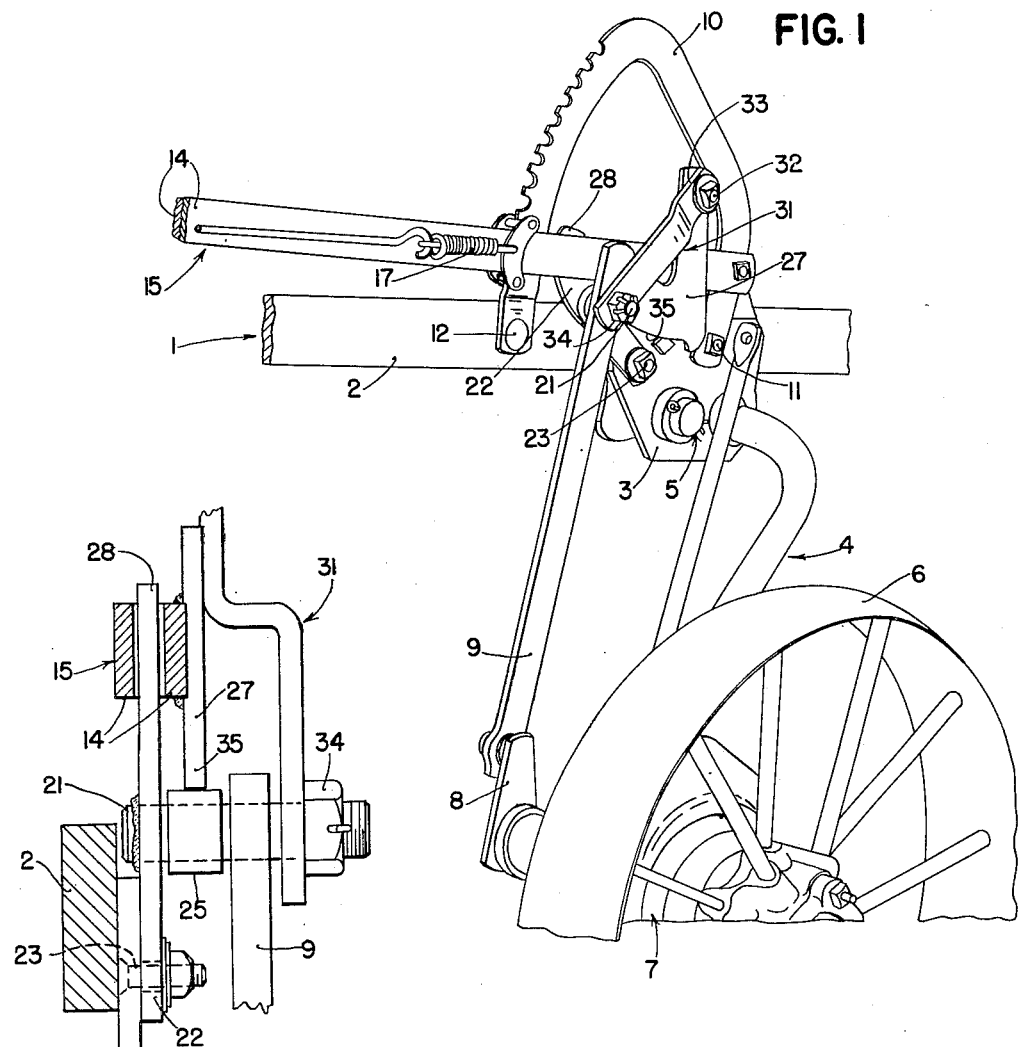
Figure 1 is a fragmentary perspective view showing a portion of a tractor plow in which the principles of the present invention have been incorporated, the plow being shown in its lifted or transport position.
Figure 3 is a view taken generally along the line 3—3 of Figure 4.

Referring now to the drawings, the plow is indicated in its entirety by the reference numeral 1 and is largely of conventional construction, embodying beams 2 making up the frame of the plow. Each of the beams is provided with a bearing bracket 3 in which a landwheel crank axle 4 is journaled for swinging movement. A furrow wheel crank axle 5 is likewise received in the bearing bracket 3 for swinging movement. A furrow wheel (not shown) is mounted on the furrow wheel crank axle 5 and a land wheel 6 is mounted on the land wheel crank axle 4. The land wheel 6 is arranged to drive a self-interrupting clutch unit 7 which includes a crank 8 to which the lower end of a lift bar 9 is connected. The present invention is not particularly concerned with the particular details per se of the clutch unit 7, it being sufficient to note that the clutch unit 7 is substantially the same as the self-interrupting or power lift clutch unit shown in the United States Patent to Carl G. Strandlund, 2,358,261, issued September 12, 1944, to which reference may be made if necessary.

A sector 10 is bolted, as at 11 and 12, to the associated frame bar or plow beam 2, and disposed on opposite sides of the sector 10 is a pair of members 14 which constitute a depth adjusting hand lever 15 which is pivoted, at 16, to a portion of the sector 10, being thus connected with the frame of the plow. The lever 15 carries the usual detent mechanism 17 which cooperates with the notched portion of the sector 10 in the usual manner. The members 14 are held in spaced apart relation by spacers or the like. The upper end of the lift bar 9 is pivotally received on a stud 21 which is fixed, as by welding, to a swingable link 22 pivoted, as at 23, to the plow frame 2, preferably to the forward portion of the associated bearing bracket 3. Disposed between the upper end of the lift bar 9 and the swinging link 22 is a roller 25 which is disposed in the plane of a cam member 27 which is secured, as by welding, to the outer side of the outer member 14 making up the adjusting lever 15. An end portion 28 of the swinging link 22 is formed so as to extend into the space between the two members 14 of the hand lever 15. This serves to guide and stabilize the swinging link 22 and, as best shown in Figure 3, reenforce the same against lateral deflection when subjected, for example, to upwardly directed loads transmitted thereto through the lift bar 9. A link 31 is pivotally connected, as at 32, to an extension 33 of the cam member 27 and at the other end is apertured to pivotally receive the outer end of the stud 21. A castellated nut 34 is adjustably threaded onto the stud 21 and serves to maintain the parts in assembled relation, as clearly shown in Figure 3. When subjected to an upwardly directed load, as when the plow is in transport position, the major portion of the stresses are transmitted through the roller 25 directly to the cam member 27 on the lever 15, the cam edge 35 of the cam member 27 being arcuate about the point 32. However, a portion of the loads is transmitted to the lever 15 through the outer link 31. A lug 36 on the cam member 27 comes up against the roller 25 when the lever 15 is in a deep plowing position.

The parts and pivot points are so arranged that when the hand lever 15 is operated from its position of deepest plowing (Figure 2) to a position of shallow plowing (Figure 4), the stud 21 on the swinging link is moved through a path P which is approximately perpendicular to the lift bar 9. By virtue of this construction, the adjusting mechanism just described provides a substantially constant lift unit; that is, the lifted position of the plow is not appreciably affected by having the depth adjusting lever 15 in different positions. On the other hand, when the plow is in its operating position, movement of the hand lever 15 acts through the link 9 and associated parts to change the position of the crank axle 4 and hence changes the depth of operation of the plow.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In an agricultural implement having a frame, power lift mechanism comprising a crank axle swingably connected with said frame and carrying a ground wheel swingable relative to the frame with said crank axle between raised and lowered positions, a lifting clutch on said crank axle driven from said ground wheel and including a clutch-operated crank, and a lift bar connected at its lower end with said crank, the combination therewith of a link member swingably connected with said frame at one end and at the other end pivotally connected with the upper end of said lift bar, an adjusting lever pivoted to said frame, a link pivoted at one end to said lever and at the other end to the pivot between said lift bar and swinging link, an abutment member mounted on said last mentioned pivot, and a cam member fixed to said lever and having a curved edge portion arcuate about the pivot connection between said link and lever and engageable with said abutment member to relieve said links of a considerable portion of the force transmitted thereto by said lift bar.

2. In an agricultural implement having a frame, a crank axle swingably connected therewith, and a generally vertically extending lift bar connected at its lower end with said crank axle, adjustable means for connecting the upper end of said lift bar and said frame, comprising a swinging link connected at one end with said frame, pivot means including an abutment section connecting the other end of said swinging link with the upper end of said lift bar, and an adjusting lever pivoted to said frame and having a cam against the edge of which said abutment section bears.

3. In an agricultural implement having a frame, a crank axle swingably connected therewith, a lift bar pivotally connected at its lower end with said crank axle, and an adjusting lever pivotally connected with said frame, connecting means between said lift bar and said lever, comprising a swinging link pivotally connected at one end with said frame and at the other end having a stud to which the upper end of said lift bar is connected, a roller on said stud, and an abutment section on said adjusting lever engaging said roller whereby adjusting the position of said lever acts through said roller and lift bar for changing the position of said crank axle.

4. In an agricultural implement having a frame, a crank axle swingably connected therewith, a self-interrupting clutch unit including a crank connected with the lower end of said crank axle and a lift bar pivotally connected at its lower end with said crank, adjusting mechanism comprising an adjusting lever pivotally connected with said frame, a swingable link pivotally connected at one end with said frame and carrying means serving as a stud, said lift bar being connected at its upper end with said stud, a link extending between said stud means and said lever, and cooperating means on said lever and the swingable link for preventing displacement of the latter under the loads imposed thereon by said lift bar.

5. The invention set forth in claim 4, further characterized by a roller on said stud means, a cam section on said lever, said second link serving to hold said roller against said cam section in different positions of the lever.

6. The invention set forth in claim 4, further characterized by said lever including a pair of spaced apart portions and said swingable link having a part extending between said portions.

7. In an agricultural implement having means serving as a frame, a swingable link pivoted thereto, a stud on the swinging end of said link, a roller on said stud, a lever having a cam section receiving said roller and pivoted to said frame means, and a link pivoted at one end on said stud and at the other end to said lever for holding said roller against said cam section.

8. In an agricultural implement having means serving as a frame, a swingable link pivoted thereto, a stud on the swinging end of said link, a roller on said stud, a lever having a cam section receiving said roller and pivoted to said frame means, and a link pivoted at one end on said stud and at the other end to said lever for holding said roller against said cam section, said lever including a pair of spaced apart portions and said swingable link having an extension, disposed between and guided by said portions.

9. In an agricultural implement having means serving as a frame, a sector fixed thereto, a lever comprising a pair of members disposed on opposite sides of said sector and pivotally mounted with respect thereto for movement into different positions of adjustment, a swingable link pivotally connected with said frame means and including an extension disposed between said lever members, and a link pivotally connected at one end with said lever and at the other end with an intermediate point on said swingable link.

10. In an agricultural implement, frame means, a sector fixed thereto, a lever pivotally connected with said frame means and including a pair of members disposed on the opposite sides of said sector and a transverse section including portions on opposite sides of said lever, a member movably connected with said frame and including an extension disposed between said lever members, a cam member on one of said transverse portions of said lever, means on said movable member adapted to bear against said cam member, and a link pivoted to the other transverse section of said lever and connected with said movable member for holding the latter in position relative to said cam section.

11. In an agricultural implement having a frame, a crank axle swingably connected therewith, a lift bar pivotally connected at its lower end with said crank axle, and an adjusting lever pivotally connected with said frame, connecting mechanism between said adjusting lever and said lift bar, comprising a swinging link pivotally connected at one end with said frame and at the other end pivotally connected with the upper end of said lift bar, a roller carried adjacent the pivotal connection between said lift bar and swinging link, a cam section carried by said adjusting lever and acting against said roller, and a lug on the cam section adapted to engage said roller when said adjusting lever has been swung into one of its positions.

12. For use in an agricultural machine having a frame and including power lift mechanism comprising a crank axle swingably connected with said frame and carrying a ground wheel swingable relative to the frame with said crank axle between raised and lowered positions, a lifting clutch on said crank axle driven from said ground wheel and including a clutch-operated crank, and a lift bar connected at its lower end with said crank, lift adjusting means comprising a link member adapted to be swingably connected with said frame at one end and at the other end pivotally connected with the upper end of said lift bar, an adjusting lever adapted to be pivoted to said frame, a link pivoted at one end to said lever and at the other end to the pivot between said lift bar and swinging link, an abutment member mounted on said last mentioned pivot, and a cam member fixed to said lever and having a curved edge portion arcuate about the pivot connection between said link and lever and engageable with said abutment member to relieve said links of a considerable portion of the force transmitted thereto by said lift bar.

OREY W. OERMAN.
JULIUS PETERSON.

REFERENCES CITED

The following references are of record in the file of this patent:

UNITED STATES PATENTS

| Number | Name | Date |
|---|---|---|
| 348,229 | McPherson | Aug. 31, 1886 |
| 379,969 | McPherson | Mar. 27, 1888 |
| 809,165 | Beeney | Jan. 2, 1906 |
| 1,001,163 | Pilman | Aug. 22, 1911 |
| 1,865,431 | Boda | July 5, 1932 |
| 2,181,410 | Strandlund | Nov. 28, 1939 |
| 2,184,416 | Ego | Dec. 26, 1939 |
| 2,187,665 | Scates | Jan. 16, 1940 |
| 2,240,783 | Jandus | May 6, 1941 |
| 2,305,225 | Skareen | Dec. 15, 1942 |